United States Patent
Xu et al.

(10) Patent No.: US 8,553,383 B2
(45) Date of Patent: Oct. 8, 2013

(54) UNDER-VOLTAGE PROTECTION CIRCUIT FOR BATTERY

(75) Inventors: Yan Xu, Shenzhen (CN); Hui Yin, Shenzhen (CN); Yan-Ling Geng, Shenzhen (CN); Wei Huo, Shenzhen (CN); Bo-Ching Lin, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 93 days.

(21) Appl. No.: 13/109,977

(22) Filed: May 17, 2011

(65) Prior Publication Data
US 2012/0092801 A1      Apr. 19, 2012

(30) Foreign Application Priority Data
Oct. 15, 2010    (CN) .......................... 2010 1 0510349

(51) Int. Cl.
*H02H 7/00*      (2006.01)
(52) U.S. Cl.
USPC .............................. 361/92; 361/18

(58) Field of Classification Search
USPC ...................................... 361/18, 92
See application file for complete search history.

(56) References Cited

U.S. PATENT DOCUMENTS

| | | | |
|---|---|---|---|
| 3,754,182 A * | 8/1973 | Morris et al. ................. 323/299 |
| 7,660,090 B1 * | 2/2010 | Daugherty .................. 361/91.1 |
| 7,800,869 B1 * | 9/2010 | Daugherty ...................... 361/18 |
| 2010/0014203 A1 * | 1/2010 | Teggatz et al. ............... 361/91.1 |

* cited by examiner

*Primary Examiner* — Danny Nguyen
(74) *Attorney, Agent, or Firm* — Altis & Wispro Law Group, Inc.

(57) ABSTRACT

An under-voltage protection circuit has a power input terminal connected to a battery, a power output terminal connected to an electronic device, a switch circuit for switching the power supply circuit from the power input terminal to the power output terminal, a control circuit for controlling the switch circuit, and a control voltage generating circuit that generates a first control voltage when the switch circuit is cut off. The control circuit controls the switch circuit in accordance with the first control voltage. The control voltage generating circuit further generates a second control voltage when the switch circuit is conductive, and then the control circuit controls the switch circuit in accordance with the second control voltage.

2 Claims, 2 Drawing Sheets

UNDER-VOLTAGE PROTECTION CIRCUIT FOR BATTERY

BACKGROUND

1. Technical Field

The present disclosure relates to a protection circuit for a battery, and particularly, to an under-voltage protection circuit for a battery.

2. Description of Related Art

Many electronic devices use batteries as power supplies. To prevent over-discharging and damaging the batteries, an under-voltage protection circuit can be used to cut off the power supply track from the battery to the electronic device to remove the load from the battery when the battery voltage is lower than the working voltage of the electronic device, and thus protects the battery from being over-discharged.

The electronic device can be turned on when the battery voltage is higher than the working voltage, and monitors the battery voltage by software. However, the overall resistance of the power supply circuit is increased while the electronic device is turned on, making the voltage while the battery is under load lower than the working voltage of the electronic device. This condition may cause malfunction of the electronic device, and the software may not be able to detect the low-voltage to inform the user to turn off the electronic device. The low-voltage electronic device may crash or shut down, and may be turned on and off repeatedly but never be fully functional. Therefore, what is needed is an under-voltage protection circuit to control the power supply of the electronic device that can overcome the above-mentioned deficiency.

BRIEF DESCRIPTION OF THE DRAWINGS

The components in the drawings are not necessarily drawn to scale, the emphasis instead being placed upon clearly illustrating the principles of an under-voltage protection circuit. Moreover, in the drawings, like reference numerals designate corresponding parts throughout the several views.

DETAILED DESCRIPTION

Figure 1:
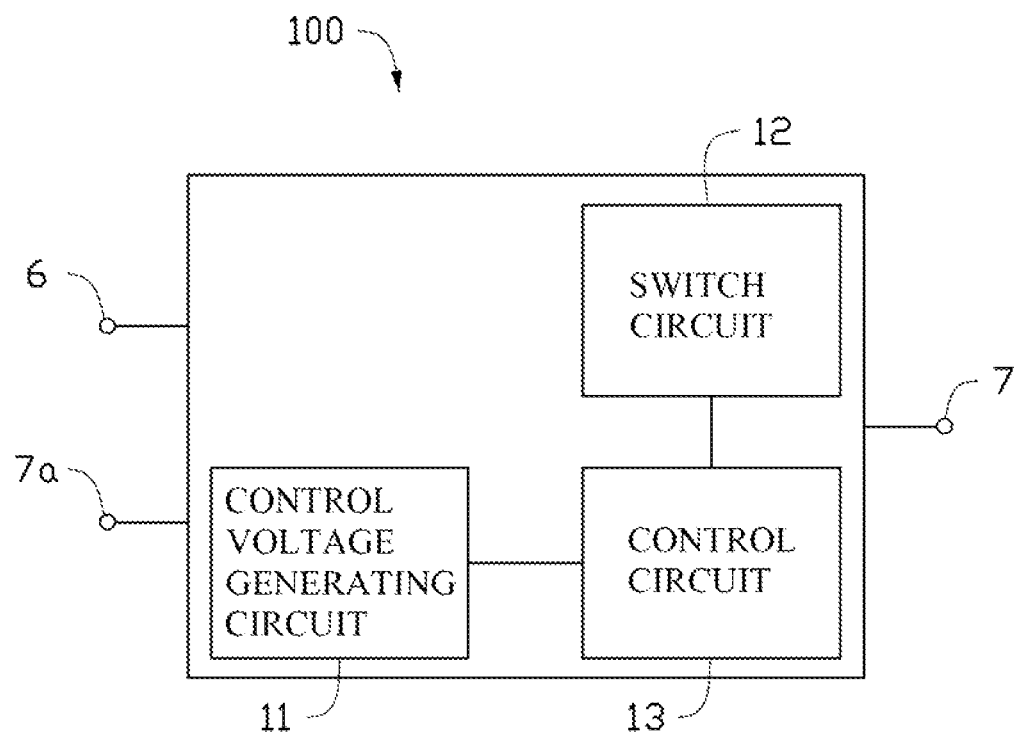
FIG. 1 is a block diagram of an under-voltage protection circuit in accordance with an exemplary embodiment.

Referring to FIG. 1, an under-voltage protection circuit 100 includes a power input terminal 6, a power output terminal 7, a feedback input terminal 7a, a control voltage generating circuit 11, a switch circuit 12, and a control circuit 13. The power input terminal 6 is connected to a battery (not shown), and the power output terminal 7 is connected to an electronic device (not shown). The control voltage generating circuit 11 can generate a first control voltage in accordance with the power input from the power input terminal 6 when a power supply circuit from the battery to the electronic device is cut off, or generate a second control voltage in accordance with a feedback voltage from the feedback input terminal 7a when the battery supplies power to the electronic device.

The control voltage generating circuit 13 can compare the first control voltage or the second control voltage with a pre-set voltage reference of the control circuit 13. If the first control voltage or the second control voltage is higher than the pre-set voltage reference, the control circuit 13 will control the switch circuit 12 to close the power supply circuit from the power input terminal 6 to the power output terminal 7 to allow the battery to provide power to the electronic device. If the first control voltage or the second control voltage is lower than the pre-set voltage reference, the control circuit 13 will control the switch circuit 12 to open the power supply circuit from the power input terminal 6 to the power output terminal 7 so as to cut off the power supply from the battery to the electronic device.

Figure 2:
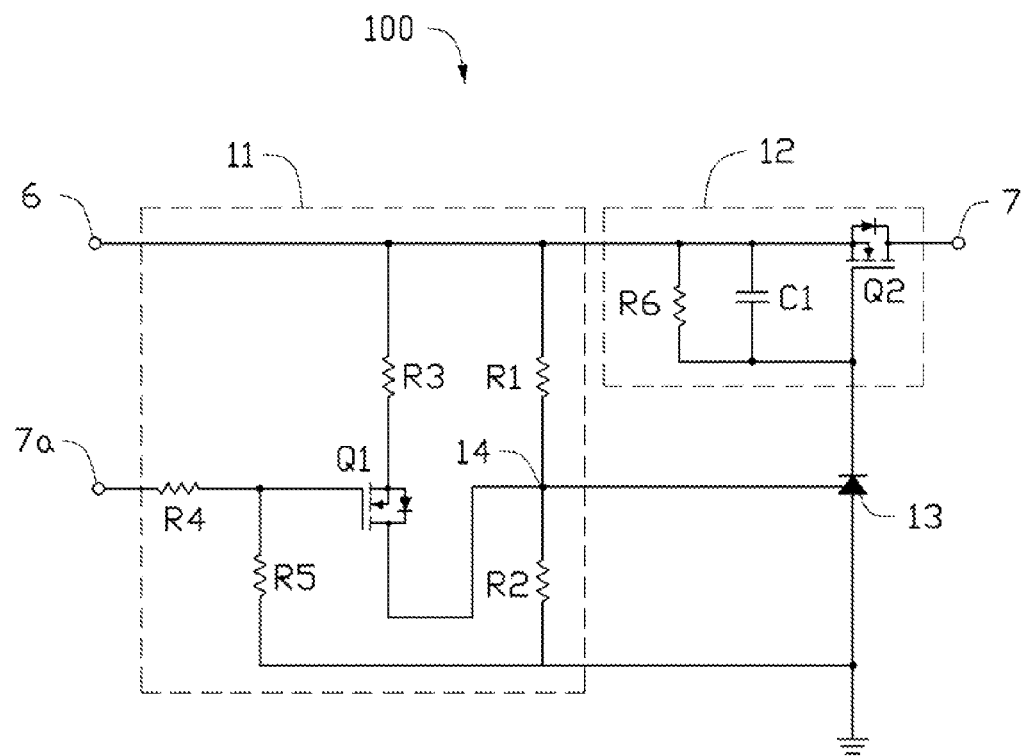
FIG. 2 is a circuit diagram of the under-voltage protection circuit of FIG. 1.

Referring to FIG. 2, the control voltage generating circuit 11 is connected to the power input terminal 6, and includes a resistor R1 and a resistor R2 connected in series. The first control voltage is formed at the node 14 between the resistors R1 and R2 and determined by the resistor R1, the resistor R2, and the voltage input from the power input terminal 6.

The node 14 is connected to the control circuit 13 to determine whether the first control voltage is higher or lower than the pre-set voltage reference of the control circuit 13 and control the switch circuit 12 accordingly. In the present embodiment, the control circuit 13 is an adjustable precision shunt regulator with a pre-set voltage of 2.5V. The anode and cathode of the adjustable precision shunt regulator conducts if the first control voltage is higher than the pre-set voltage reference, and the anode and cathode of the adjustable precision shunt regulator does not conduct if the first control voltage is lower than the pre-set voltage reference.

The switch circuit 12 includes a switch Q2 to switch the power supply circuit from the power input terminal 6 to the power output terminal 7. In the present embodiment, the switch Q2 is a NMOS field-effect transistor, and the gate of the NMOS field-effect transistor is connected to the adjustable precision shunt regulator; the drain and the source of the switch Q2 is connected with the power input terminal 6 and the power output terminal 7, respectively. The switch circuit 12 further includes a resistor R6 and a capacitor C1 connected in parallel, wherein the resistor R6 is for adjusting the working current of the adjustable precision shunt regulator, and the capacitor C1 is for applying time delay to the switch circuit 12.

The control voltage generating circuit 11 is connected to the feedback input terminal 7a, wherein the feedback input terminal 7a is connected to a resistor R4 and a resistor R5 connected in series to control a switch Q1 of the control voltage circuit 11. When the first control voltage is higher than the voltage reference of the control circuit 13, the power supply circuit from the power input terminal 6 to the power output terminal 7 conducts and the power output terminal 7 outputs to the electronic device as well as the feedback input terminal 7a, and thus controls conductivity of the switch Q1 to be conducted. When the switch Q1 is conducted, a resistor R3 connects to the resistor R1 in parallel and then connect to the resistor R2 in series, and thus the second control voltage is formed at the node 14 to replace the first control voltage. In other words, the first control voltage is determined by the resistor R1 and the resistor R2, but the second control voltage is determined by the resistor R1, the resistor R2, and the resistor R3. In the present embodiment, the switch Q1 is a NMOS field-effect transistor, and the gate of the NMOS field-effect transistor is connected between the resistor R4 and the resistor R5; the drain and the source of the switch Q1 are connected with the resistor R3 and the node 14, respectively.

Therefore, the power supply from the power input terminal 6 to the power output terminal 7 is maintained while the battery is under load. The power supply will be maintained until the second control voltage is lower than the pre-set voltage reference.

What is claimed is:

1. An under-voltage protection circuit, comprising:
a power input terminal for being connected to a battery;
a power output terminal for being connected to an electronic device;
a switch circuit for switching a power supply from the power input terminal to the power output terminal;
a control circuit for controlling the switch circuit; and
a control voltage generating circuit that generates a first control voltage when the switch circuit is cut off, wherein the control circuit controls the switch circuit in accordance with the first control voltage; the control voltage generating circuit further generates a second control voltage when the switch circuit is conducted, wherein the control circuit controls the switch circuit in accordance with the second control voltage; the control voltage generating circuit comprises a first resistor and a second resistor connected in series, and the first control voltage is formed on a node between the first resistor and the second resistor; the control voltage generating circuit further comprises a first switch and a third resistor; when the switch circuit is conducted, the power output terminal feedbacks to the control voltage generating circuit, and control the first switch to be conducted; upon the first switch being conducted, the third resistor connects to the first resistor in parallel and then connected with the second resistor in series to form the second control voltage on the node between the first resistor and the second resistor.

2. The under-voltage protection circuit as claimed in claim 1, wherein the first switch is a nMOSFET, and the power output terminal feedbacks to a gate of the first switch to control the first switch; a drain of the first switch is connected to the power input terminal, and a source of the first switch is connected to the node between the first resistor and the second resistor.

* * * * *